US005825135A

United States Patent [19]

Chang

[11] Patent Number: 5,825,135

[45] Date of Patent: Oct. 20, 1998

[54] HALOGEN LAMP CONTROL CIRCUIT ASSEMBLY

[76] Inventor: Chin-Hsiung Chang, No. 947, Lin Shen Rd., Wu Fong Hsiang, Taichung Hsien, Taiwan

[21] Appl. No.: 814,591

[22] Filed: Mar. 10, 1997

[51] Int. Cl.[6] .................................................... H05B 37/02

[52] U.S. Cl. .......................... 315/291; 315/294; 315/307; 315/DIG. 4

[58] Field of Search .................................... 315/294, 291, 315/307, 308, DIG. 4, DIG. 5, DIG. 7, 292, 293, 312, 320, 324, 325, 194

[56] References Cited

U.S. PATENT DOCUMENTS 5,430,356 7/1995 Ference et al. ......................... 315/291

*Primary Examiner*—Robert J. Pascal
*Assistant Examiner*—David H. Vu
*Attorney, Agent, or Firm*—Varndell Legal Group

[57] ABSTRACT

A halogen lamp control circuit assembly in which a light intensity regulating remote controller is used to provide a light intensity control signal to a microprocessor of a master unit for controlling an electronic transformer, causing it to provide an alternative current/12 V output for controlling the operation and light intensity of a halogen lamp and simultaneously driving a first slave unit, the first slave unit being driven to produce an alternative current/12 V output for controlling the operation and light intensity of a respective halogen lamp and simultaneously driving a second slave unit when received an alternative current/12 V output from the master unit, the second slave unit and posterior slave units being operated one after another in the same manner.

4 Claims, 6 Drawing Sheets

3
9 AC/120V
5
7
12VAC/OUT
MASTER UNIT
SLAVE UNIT
12VAC/OUT
TO NEXT SLAVE UNIT
120V
4
6
17
8

HALOGEN LAMP CONTROL CIRCUIT ASSEMBLY

BACKGROUND AND SUMMARY OF THE INVENTION

The present invention relates to a halogen control circuit assembly, and more particularly to such a halogen lamp control circuit assembly which permits the user to regulate the intensity of light of a big number of halogen lamps synchronously through a common light intensity controller.

A regular halogen lamp control circuit assembly, as shown in FIG. 1, is generally comprised of an electronic transformer, and a light intensity regulator (controller). The light intensity regulator comprises a variable resistor, and a TRIAC. When the variable resistor is adjusted, a signal is sent to the electronic transformer to control its output, so that the intensity of light is relatively adjusted. However, because of the constraint of the rated power of the electronic transformer and the TRIAC of the light intensity regulator, only a limited number of halogen lamps can be controlled. If to increase the load (the number of halogen lamps), an electronic transformer and a light intensity regulator of relatively higher rated power must be used. Therefore, when several halogen lamps are installed, they are commonly connected in parallel to a bus line (see FIG. 2), and separately controlled by a respective electronic transformer and a respective light intensity regulator. This arrangement allows the halogen lamps to be simultaneously turned on/off by a common ON/OFF switch, however the intensity of light of each halogen lamp must be separately regulated. Further, if the user keeps adding the number of halogen lamps to the bus line without considering the rated capacity of the bus line, an electric short circuit may occur during the operation of the halogen lamp control circuit assembly.

The present invention provides a halogen lamp control circuit assembly for controlling the intensity of light of a plurality of halogen lamps synchronously without being constrained by the power rate of the control circuit assembly. According to the present invention, the halogen lamp control circuit assembly comprises a light intensity regulating remote controller, a master unit controlled by the light intensity regulating remote controller to control the intensity of light of a master halogen lamp, a plurality of slave units synchronously controlled by the light intensity regulating remote controller through the master unit to regulate the intensity of light a respective slave halogen lamp. The master unit comprises an electronic transformer, a direct current power supply rectifier circuit, a microprocessor, an output drive, a zero crossing detector, and a RF receiver module, wherein the direct current power supply rectifier circuit drops city power supply and converts it into a low voltage direct current power supply and then provides it to the microprocessor and the RF receiver module; the RF receiver module receives a light intensity regulating control signal from the light intensity regulating remote controller and sends it to the microprocessor, causing the microprocessor to control the output drive in driving the electronic transformer; the electronic transformer is driven by the output drive to provide an alternative current 12 V output signal for controlling the operation and light intensity of the master halogen lamp and the operation of the slave units; the alternative current 12 V output signal from the parallel to a bus line according to the prior art.

DETAILED DESCRIPTION OF THE PREFERRED EMBODIMENT

Figure 1:
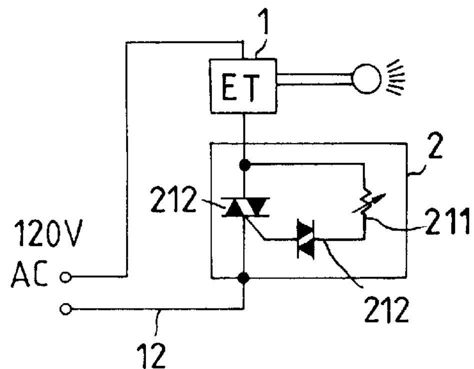
FIG. 1 is a circuit diagram of a halogen lamp control circuit assembly according to the prior art.
Figure 2:
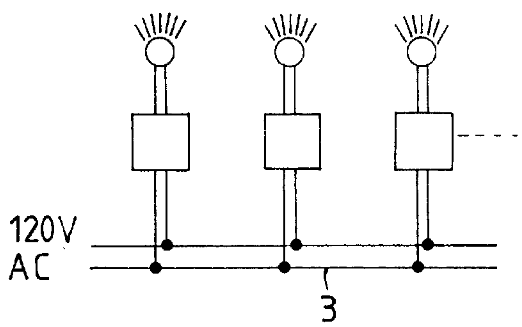
FIG. 2 shows a plurality of halogen lamps connected in parallel to a bus line according to the prior art.
Figure 3:
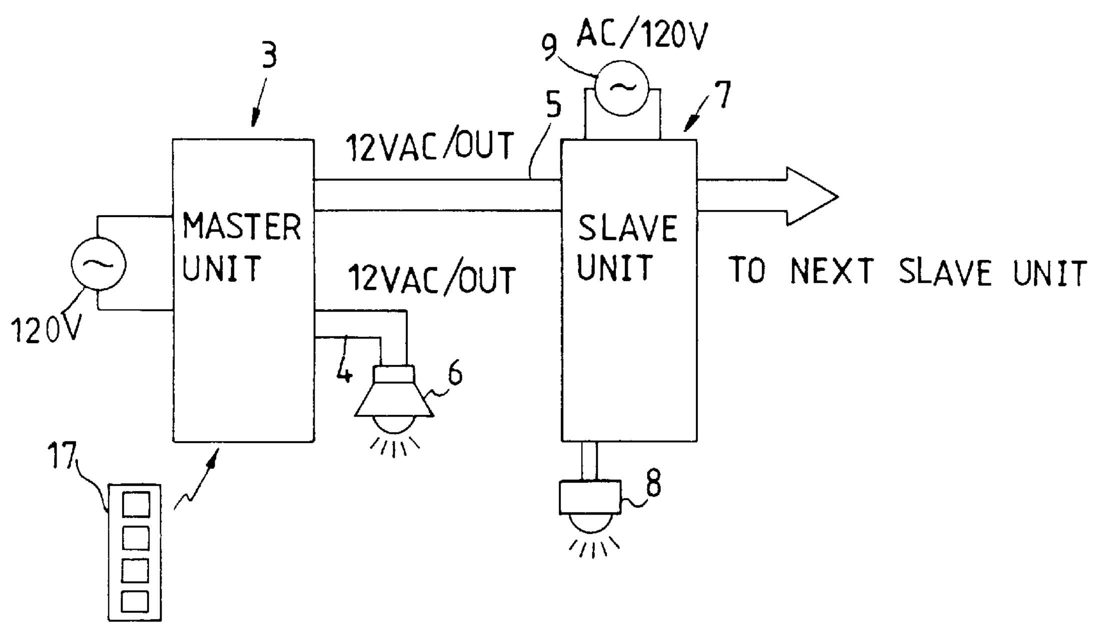
FIG. 3 is a circuit block diagram of the present invention, showing the connection between the master unit and the slave unit according to the present invention.

Referring to FIG. 3, an alternative current/120 V power supply is inputted into a master unit 3, causing it to provide two alternative current/12 V parallel loops 4; 5. One alternative current/12 V loop 4 is sent to a master (halogen) lamp 6. The other alternative current/12 V loop 5 is sent to a slave unit 7, and used as a control signal line to synchronously control a slave lamp 8. Power source for the slave lamp 8 is obtained from an independent alternative current/120 V power supply 9. Therefore, the slave lamp 8 is not constrained by the rated power of the master unit 3, the slave unit 7 can provide a alternative current/12 V control signal to a next slave unit for a synchronous control, unlimited number of lamps can be synchronously controlled by a light intensity regulating remote controller 17 to change their power rate, that is to change their intensity of light synchronously.

Figure 4:
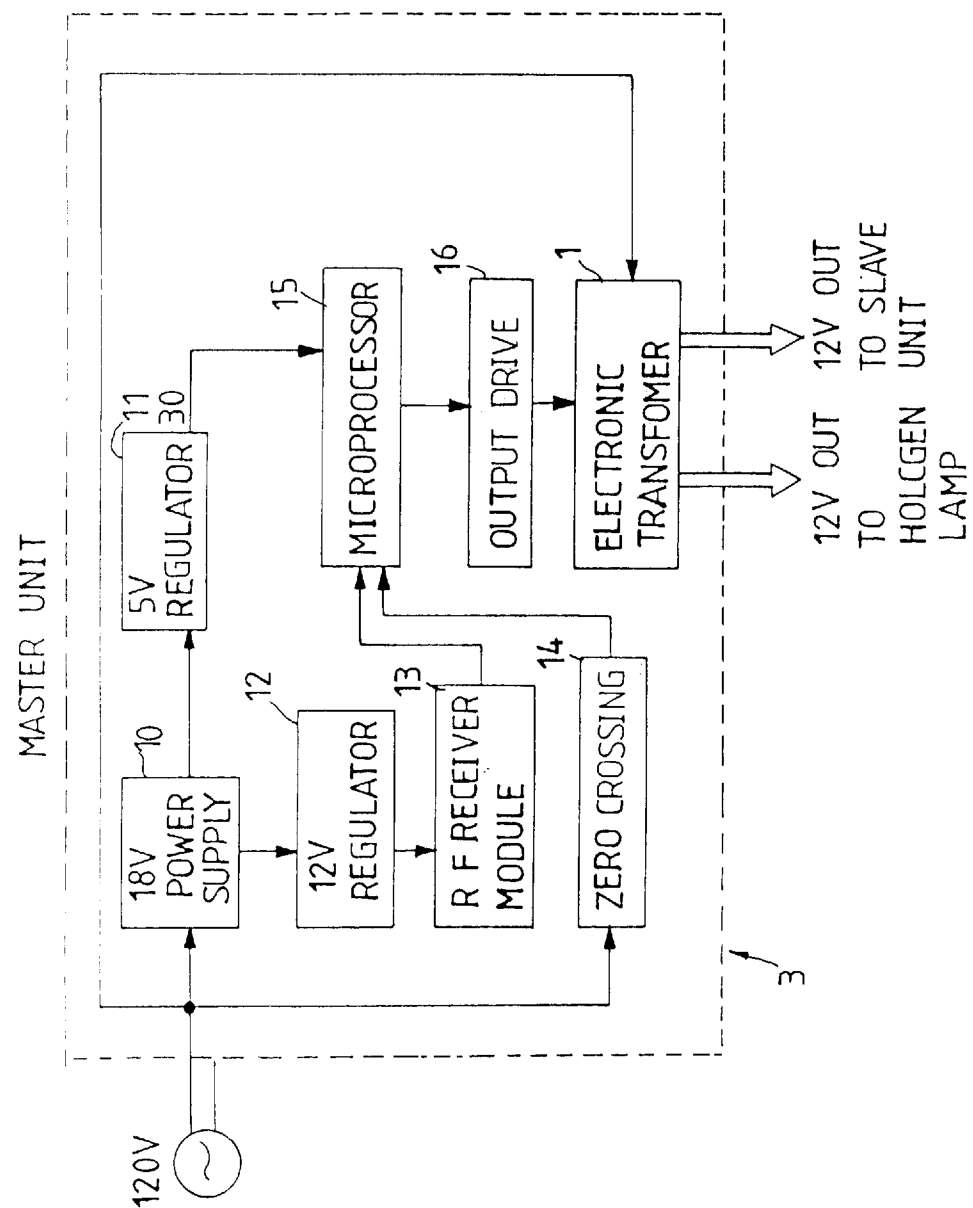
FIG. 4 is a circuit block diagram of the master unit of the halogen lamp control circuit assembly according to the present invention.

Referring to FIG. 4, the master unit 3 is comprised of a direct current/18 V power supply 10, a direct current/5 V regulator 11, a direct current/12 V regulator 12, a RF receiver module 13, a zero crossing detector 14, a microprocessor 15, an output drive 16, and an electronic transformer 1. Alternative current/120 V power supply is provided to the electronic transformer 1, causing it to provide alternative current/12 V power supply for the master lamp 6 and the slave unit 7 (see also FIG. 3). The zero crossing detector 14 detects zero phase of alternative current power supply for use as a reference value for regulation of light intensity. The direct current/18 V power supply 10 provides the master unit 3 with the necessary working voltage, and regulated by the direct current/5 V for the microprocessor 15 and direct current/12 V for the RF receiver module 13. When a control signal is inputted into the master unit 3, it is sent to the microprocessor 15, causing it to provide a control signal to the output drive 16. When the output drive 16 receives the control signal from the microprocessor 15, it immediately drives the electronic transformer 1 to change its effective work time cycle, so as to regulate the intensity of light.

Figure 5:
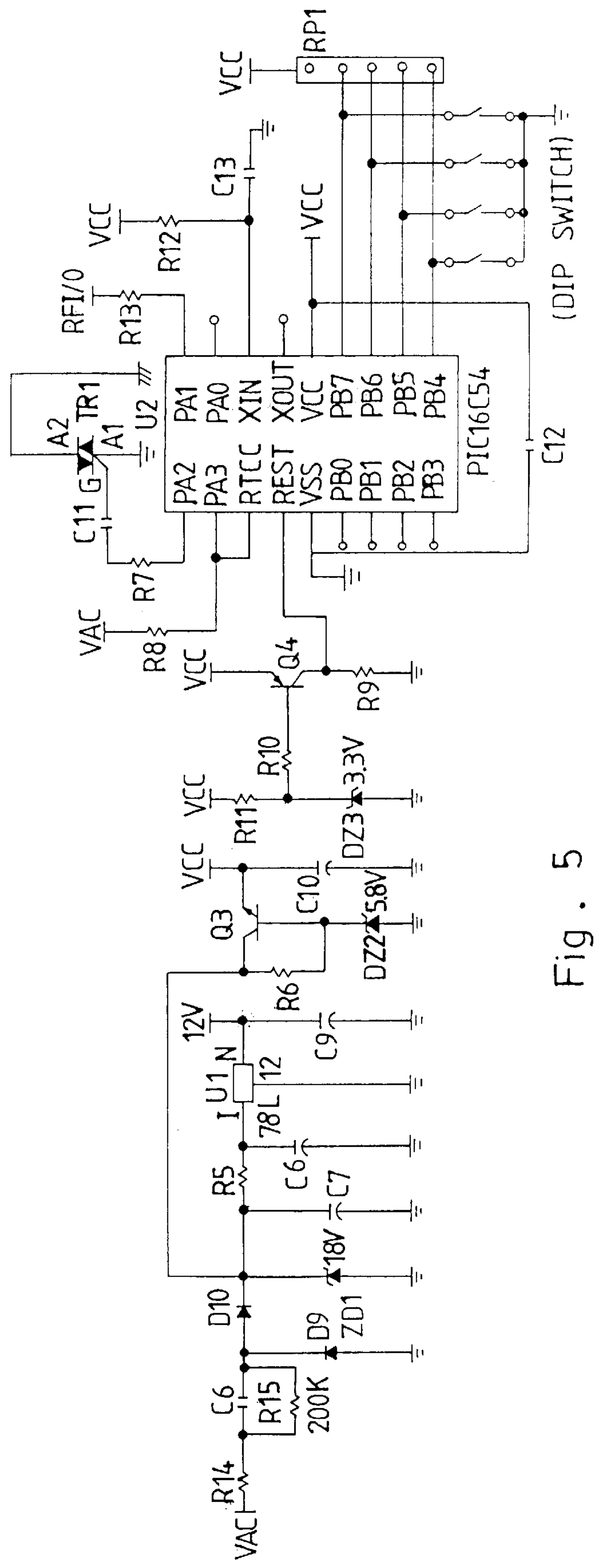
FIG. 5 is a circuit block diagram of the master unit of the halogen lamp control circuit assembly according to the present invention.
Figure 6:
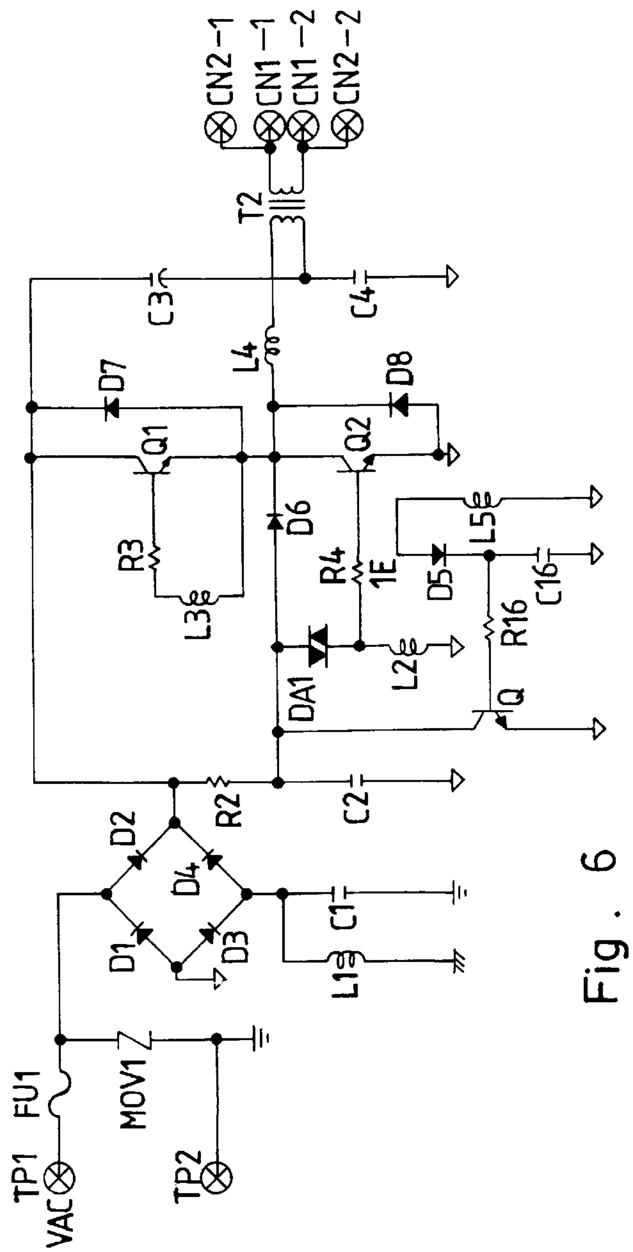
FIG. 6 is a circuit block diagram of the electronic transformer of the halogen lamp control circuit assembly according to the present invention.
Figure 7:
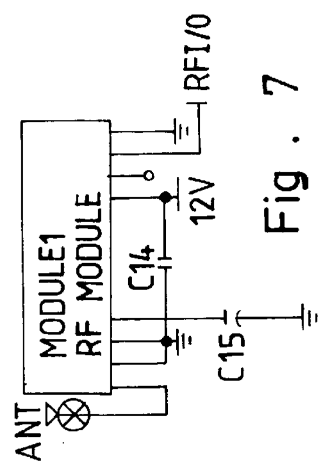
FIG. 7 is a circuit block diagram of the RF receiver module of the halogen lamp control circuit assembly according to the present invention.

The circuit diagram of the aforesaid master unit 3 is shown in FIG. 5. The aforesaid direct current/18 V power supply 10 is obtained from a zener diode ZD1. In FIG. 5, Vcc indicates direct current/5 V, which is inputted through V alternative current and R8 into the microprocessor to form the aforesaid zero crossing detector 14. The circuit diagram of the aforesaid electronic transformer 1 is shown in FIG. 6, in which terminals CN1 and CN2 are connected in parallel to the output transformer T2 at the output end of the electronic transformer 1, and used as triggering control signal lines for the aforesaid slave lamp 8 and the next slave unit. The circuit diagram of the aforesaid RF receiver module 13 is shown in FIG. 7, in which direct current/12 V is provided for receiving the command signal given by the user.

Figure 8:
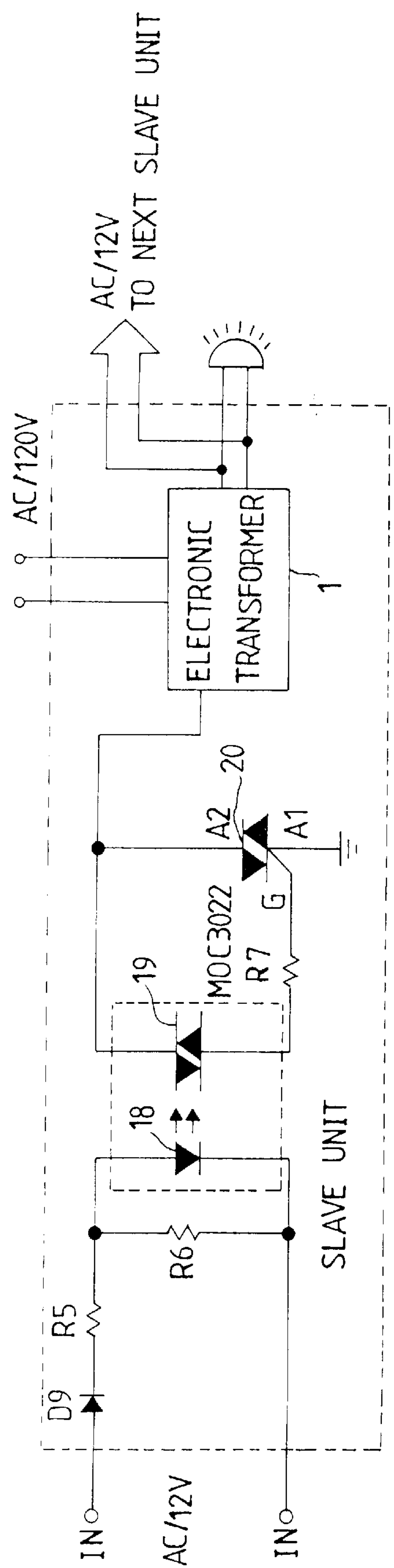
FIG. 8 is a circuit block diagram of the slave unit of the halogen lamp control circuit assembly according to the present invention.
Figure 9:
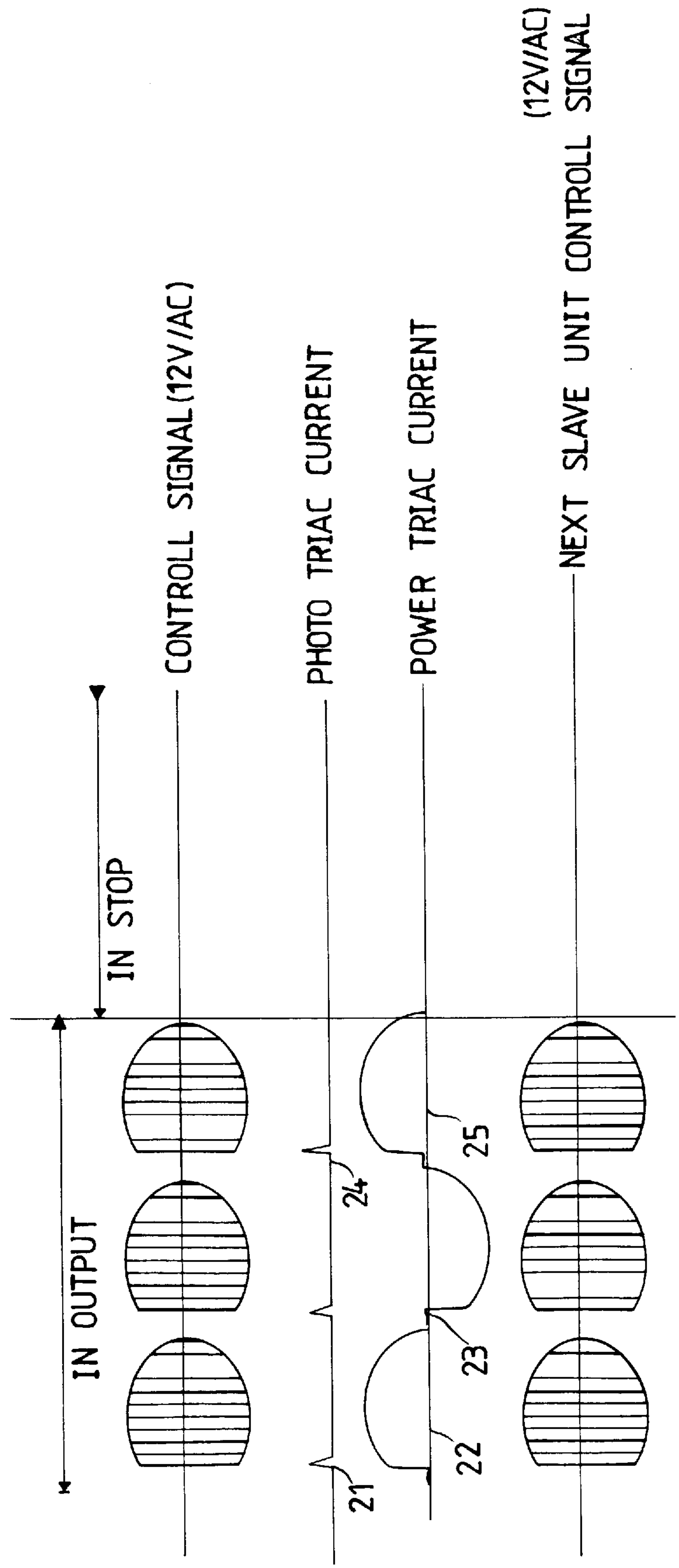
FIG. 9 is a waveform chart obtained from the master unit of the halogen lamp control circuit assembly according to the present invention.

The operation of the aforesaid slave unit 7 is outlined hereinafter with reference to FIGS. 8 and 9, alternative current/12 V at the input end IN is otabined from the control signal line CN1 or CN2 shown in FIG. 6. If the voltage of the positive half-wave of 12 V alternative current power supply surpasses the diode voltage 0.7 V when at the output state, the diode Da is electrically connected, and a forward bias voltage is provided to the light emitting diode 18 of the chip MOC3022. Therefore, the light emitting diode 18 is turned on. When the light emitting diode 18 is turned on, the photo TRIAC 19 is induced by light to let electric current singal pass to the gate G of the power TRIAC 20, thereby causing the power TRIAC 20 to be electrically connected. When the power TRIAC 20 is electrically connected, the photo TRIAC 19 is immediately turned on to provide a voltage waveform of transient triggering signal 21 as shwon in FIG. 9. When the power TRIAC 20 is triggered, the loop current keeps passing 22, and then stopped at zero potential 23. In the next cycle, the photo TRIAC 19 is triggered 24 again, causing the electric current of the power TRIAC 20 to be electrically connected 25, therefore the electric transformer 1 of the slave unit 7 is caused to oscillate, and to continuously output alternative current/12 V. When the master unit 3 is at OFF state, that is, IN STOP state, 12 V alternative current control signal produces no signal output, photo TRIAC 19 receives no triggering signal, therefore the power TRIAC 20 and the electronic transformer 1 produce no output, and all halogen lamps are turned off. When to regulate the intensity of light, the master unit 3 is used to control the triggering angle of the power TRIAC 20 in adjusting the triggering cycle, and therefore the output power rate of the halogen is controlled, that is, the light intensity of all halogen lamps are synchronously regulated. Further, the aforesaid light emitting diode 18 and photo TRIAC 19 are sealed inside the chip MOC3033. Because this circuit is an independent circuit, that is, what is installed in this 12 V alternative current is free from the interference of alternative current voltage level, it achieves same safeness as regular 12 V alternative current halogen lamps.

I claim:

1. A circuit assembly for controlling a plurality of halogen lamps comprising a light intensity regulating remote controller, a master unit controlled by said light intensity regulating remote controller for controlling the intensity of light of a master halogen lamp, a plurality of slave units synchronously controlled by said light intensity regulating remote controller through said master unit to regulate the intensity of light for a respective slave halogen lamp connected thereto, said master unit comprising an electronic transformer, a direct current power supply rectifier circuit, a microprocessor, an output drive, a zero crossing detector, and a RF receiver module, said direct current power supply rectifier circuit receiving and converting 120 volt AC supply into a low voltage direct current power and supplying said low voltage direct power to said microprocessor and said RF receiver module, said RF receiver module receiving a light intensity regulating control signal from said light intensity regulating remote controller and outputting a corresponding signal to said microprocessor, said microprocessor receiving said corresponding signal output from said light intensity regulating remote controller and, based thereon, controlling said output drive and thereby controlling said electronic transformer, said electronic transformer driven by said output drive to supply an alternating current/12 V output signal for controlling operation and light intensity of said master halogen lamp and operation of said plurality slave units, said alternating current/12 V output signal from said electronic transformer is simultaneously transmitted to intermediate slave units of said plurality of slave units, each said intermediate slave unit receiving said alternating current/12 V signal and supplying said alternating current/12 V signal to an adjacent intermediate slave unit, and a last slave unit of said intermediate slave units supplying said alternating current/12 V signal to a final slave unit of said plurality of slave units, each of said slave units respectively driving said respective halogen lamp based on said alternating current/12 V signal.

2. The circuit assembly for controlling a plurality of halogen lamps according to claim 1, wherein each of said slave units comprises a half-wave rectification diode adapted for rectifying said alternating current/12 V output signal, a light emitting diode controlled by said half-wave rectification diode to produce light, a photo TRIAC induced by light from said light emitting diode, a power TRIAC controlled by said photo TRIAC, and an electronic transformer controlled by said power TRIAC to control operation and light intensity of said respective slave halogen lamp.

3. The circuit assembly for controlling a plurality of halogen lamps according to claim 1, wherein the electronic transformer of each of said slave units independently receives 120 volt AC power supply.

4. The circuit assembly for controlling a plurality of halogen lamps according to claim 1, wherein the light emitting diode and photo TRIAC of each of said slave units are sealed within a chip.

* * * * *